A. BUCK.
Hay Loader.

No. 105,418. Patented July 19, 1870.

Witnesses:
John Becker
Geo. W. Mabee

Inventor:
A. Buck
per Munn & Co.
Attorneys.

United States Patent Office.

ADDISON BUCK, OF HEBRON, INDIANA.

Letters Patent No. 105,418, dated July 19, 1870.

IMPROVEMENT IN HAY-LOADERS.

The Schedule referred to in these Letters Patent and making part of the same.

*To all whom it may concern:*

Be it known that I, ADDISON BUCK, of Hebron, in the county of Porter and State of Indiana, have invented a new and useful Improvement in Combined Hay-Rake and Loader; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
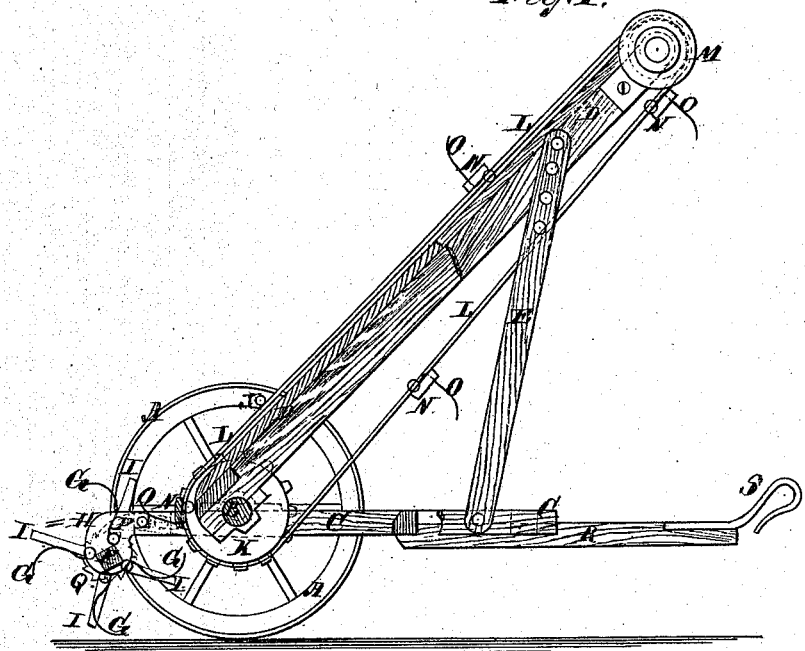
Figure 1 is a side view of my improved machine, part being broken away to show the construction.
Figure 2:
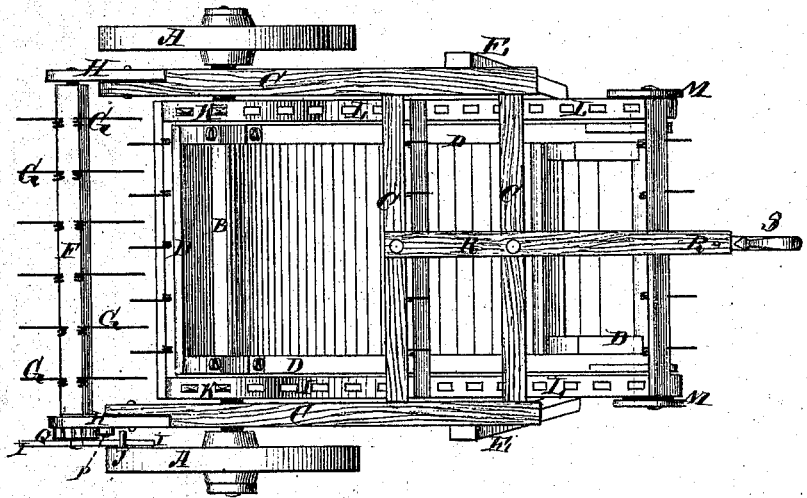
Figure 2 is an under-side view of the same.

The object of my invention is improvement in hay-loaders, such as are provided with an endless elevated carrier for receiving the hay from a revolving rake, and delivering the same on the cart, as the machine is drawn forward.

The invention consists in the combination, with the inclined elevator or carrier, of a rake-shaft, provided with arms, which are struck by a pin on one of the transporting-wheels, at every revolution of the same, whereby the shaft is partially rotated, so as to cause one of its sets of teeth to raise the hay, which they have gathered, into a position to deliver it to the carrier.

A are the drive-wheels, which are placed upon the axle B, and so connected with it by pawls and ratchet-wheels, or otherwise, as to carry the said axle with them in their revolution, as the machine is drawn forward.

C is a frame, in bearings, attached to the rear part of which the axle B revolves, so that the said frame may ride upon the said axle.

D is the inclined frame or apron, up which the hay is carried to the wagon, and in bearings attached to the lower part of the side bars of which the axle B revolves, so that the said frame may ride upon the said axle.

The upper end of the inclined apron is supported by the side bars E, the lower ends of which are attached to the forward parts of the side bars of the frame C, and the upper ends of which are attached to the upper parts of the side bars of the frame D.

Several holes may be formed in the upper parts of the bars E, for the reception of the bolts by which said bars are secured to the frame D, so that the upper end of the said frame or apron D may be raised and lowered, as the height of the wagon or load may render necessary.

F is the rake-shaft, to which are attached four, more or less, sets or rows of spring teeth or fingers, G, by which the hay is gathered.

The journals of the shaft F revolve in bearings in the outer ends of the arms H, the inner ends of which are pivoted to the side bars of the frame C, and which have shoulders formed upon them, or pins attached to them, to rest upon shoulders or notches in the ends of the said side bars of the said frame C, to prevent the shaft F from dropping too low, while leaving it free to rise to pass over obstructions.

To the outer end of one of the journals of the shaft F is attached an armed wheel, I, having as many arms as the shaft F has rows of fingers or teeth, G.

To the inner side of the wheel A is attached a pin, J, which, at each revolution of the said wheel A, strikes against one of the arms of the armed wheel I, and turns the rake-shaft sufficiently to raise the loaded teeth of said shaft into such a position that the fingers of the loader may take hold of the hay, and carry it up the inclined frame or apron to the wagon.

To the axle B, between the side bars of the frames C and D, are securely attached two spur-wheels, K, so that the said axle B may carry the said spur-wheels K with it in its revolution.

L are endless chains or bands, which pass around the spur-wheels K, and around pulleys M, pivoted to the upper end of the frame D.

To the chains or bands L, at suitable distances apart, are attached the ends of a suitable number of cross-bars or slats, N, to each of which are attached fingers, forks, or teeth, O, so that, as the machine is drawn forward, the fingers O may take the hay from the teeth G of the rake-shaft F, carry it up the inclined apron or frame D, and discharge it upon the wagon.

The shaft F is held in position, while collecting the hay, by the pawl P, pivoted to the side bar of the frame C, and the engaging end of which takes hold of the ratchet-wheel Q, attached to the journal of the said shaft F, said ratchet-wheel and pawl being so arranged as to always hold the shaft F in such positions that one of its sets of fingers G may be in position to collect the hay.

To the forward part of the frame C is attached a short tongue, R, to the end of which is attached a hook, S, or other convenient coupling, for detachably connecting the rake and loader to the rear axle of the wagon.

Having thus described my invention,

I claim as new and desire to secure by Letters Patent—

The combination and arrangement, with the carrier or apron D, and wheel or wheels A, provided with pin J, and fast on the axle B, of the revolving rake-shaft F, arms I, ratchet and pawl P Q, all operating as shown and described.

ADDISON BUCK.

Witnesses:
H. W. SMITH,
H. J. RATHBUN.